United States Patent [19]

Pennington et al.

[11] 3,887,515

[45] June 3, 1975

[54] PROCESS FOR MAKING LOW PROFILE MOLDING COMPOUNDS

[75] Inventors: Donald W. Pennington, Lake Jackson; James H. Enos, Angleton, both of Tex.

[73] Assignee: The Dow Chemical Company, Midland, Mich.

[22] Filed: Apr. 26, 1974

[21] Appl. No.: 464,378

Related U.S. Application Data

[63] Continuation-in-part of Ser. No. 329,703, Feb. 5, 1973, abandoned.

[52] U.S. Cl.................. 260/40 R; 260/836; 260/862
[51] Int. Cl............................................. C08g 51/04
[58] Field of Search ........... 260/862, 836, 873, 874, 260/887, 40 R

[56] References Cited
UNITED STATES PATENTS

| | | | |
|---|---|---|---|
| 3,050,511 | 8/1962 | Szuarc | 260/93.5 |
| 3,674,893 | 7/1972 | Nowak et al. | 260/836 |
| 3,836,600 | 9/1974 | Brembaker et al. | 260/836 |

*Primary Examiner*—Donald E. Czaja
*Assistant Examiner*—S. M. Person
*Attorney, Agent, or Firm*—H. L. Aamoth

[57] ABSTRACT

Better wet-out of glass fiber, lower viscosity of the resin mix which allows for higher filler loadings and better stability are the improvements of this invention. The improved process comprises mixing a thermosettable resin and a copolymerizable monomer with a polymeric low profile additive, fiber reinforcing material, $CaCO_3$ filler and a viscosity reducing agent comprising a block copolymer having a polyoxyethylene block segment and a block segment of polymerized alkenyl aromatic or conjugated diene monomer. Sheet and bulk molding compounds are made according to the improved process by the further addition of a chemical thickening agent such as magnesium oxide.

27 Claims, No Drawings

PROCESS FOR MAKING LOW PROFILE MOLDING COMPOUNDS

REFERENCES

This application is a continuation-in-part of copending application Ser. No. 329,703 filed on Feb. 5, 1973 and now abandoned.

BACKGROUND

Thermosettable molding compounds containing low profile (also called low shrink) additives have greatly stimulated the reinforced plastics industry. However, the preparation of low profile bulk and sheet molding compounds is troublesome in that high viscosity of the resin mix results in mechanical handling problems, poor wet-out of the reinforcing fibers and product stability problems. Further, in many cases the viscosity of the resin mix limits the amount of filler which can be incorporated therein. Higher filler loadings are desirable both from the ultimate properties imparted to the molded part and from the economic standpoint. The process of this invention overcomes the above problems.

SUMMARY

The improved process of this invention for preparing low profile molding compounds unexpectedly produces lower resin mix viscosity which improves fiber wet-out and properties of the molded article. Higher loadings of fillers can be tolerated because of the lower resin mix viscosities, and more stable molding compounds are produced.

The improved process comprises combining with a mixture of a thermosettable resin and a copolymerizable monomer at least about 0.1 part of a block copolymer viscosity reducing agent in combination with about 5 to 20 parts of a polymeric low profile material, about 10 to 150 parts of $CaCO_3$ and up to about 150 parts of a fibrous reinforcing material wherein said block copolymer has the formula

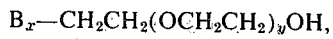

$$B_x-CH_2CH_2(OCH_2CH_2)_yOH,$$

or

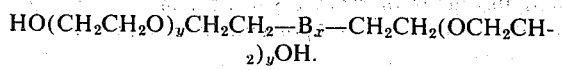

$$HO(CH_2CH_2O)_yCH_2CH_2-B_x-CH_2CH_2(OCH_2CH_2)_yOH.$$

All parts are per 100 parts of said resin-monomer mixture.

Essential to the process of this invention is the block copolymer which unexpectedly decreases the viscosity of the resin mix. In the formula B is a monoalkenyl aromatic monomer, a conjugated diene monomer or mixtures thereof polymerized into a block segment and $x$ and $y$ each have a value of at least about 25.

Thermosettable resins include unsaturated polyesters resins, terminally unsaturated vinyl ester resins or mixtures thereof.

Sheet and bulk molding compounds are prepared by the above process with the further step of adding a chemical thickening agent such as alkaline earth oxides and hydroxides.

DESCRIPTION

Basically a bulk molding compound (BMC) or a sheet molding compound (SMC) is a chemically thickened premix resin. Since this definition is commonly employed it will be used herein. A premix resin is simply a mixture of the resin and monomer with an inert filler, glass fiber and a catalyst. The catalyst is included since the resins usually are thermally cured. Other materials such as low profile additives, cure accelerators or promotors, mold release agents and the like may be added. Premix resins are soft, moldable, putty-like solids.

BMC and SMC are generally harder and less tacky than a premix and are more easily handled without changing shape. For convenience, a plastic cover film, e.g. polyethylene, is frequently used with SMC so that layers may be stacked on top of each other, rolled up, etc.

Various means may be employed to thicken a premix and prepare a BMC or SMC. Resins which contain carboxylic acid functional groups are particularly suitable for chemical thickening with alkaline earth oxides and hydroxides such as magnesium and calcium oxides and hydroxides or mixtures thereof. The thickening of vinyl ester resins in this manner is disclosed in U.S. Pat. No. 3,466,259. Thickening of unsaturated polyesters with said oxides and hydroxides is also described in U.S. Pat. Nos. 2,628,209 and 3,431,320. The above patents are incorporated by reference herein.

Chemical thickening may also be accomplished with alkaline earth oxides and hydroxides in combination with a polyhydric alcohol (see U.S. Pat. No. 3,432,458), or in combination with a cyclic anhydride (see U.S. Pat. No. 3,465,061) or in combination with lithium salts (see U.S. Pat. No. 3,538,188). Chemical thickening may also be accomplished by adding a N-vinylcarbazole monomer and triphenyl phosphite catalyst to the resin system to polymerize said carbazole (see U.S. Pat. No. 3,574,788). While a variety of means may be used to accomplish chemical thickening, alkaline earth oxides and hydroxides are preferred. Most preferred is magnesium oxide.

The method of thickening and proportions of thickening agents are taught in the above patents. In general the amount of said oxides and hydroxides varies from about 1 or 2 parts per 100 parts of resin up to 10 parts and higher. On an equivalent basis about 0.75 to 1 equivalent per equivalent of —COOH up to about 5/1 may be used. Higher amounts may be used but are usually not necessary.

Reference is made to two articles to show the state of the art: "Smooth Surface Premix and Sheet Molding Compound Technology" by H. W. Nussbaum et al, SPI, 1970 Technical Conferences, Section 6-E pp 1–5 and "Thickeners and Low Shrink Additives For Premix and SMC Systems" by F. Fekete, SPI, 1970 Technical Conference, Section 6-D, pp 1–6.

The molding compounds may be readily cured by exposure to ionizing radiation or by admixture with free radical yielding catalysts such as peroxides, persulfates and the like. With catalysts the cure may be accelerated by heating up to about 200° F or higher. The molding compounds are frequently cured by heating under pressure in a suitable mold.

Reduction in viscosity of the resin mix is important to the attainment of the benefits and advantages of this invention, i.e., improved wet-out of the reinforcing fibers and attainment of higher filler loadings. Essential to the improved process of this invention is the addition of an ethylene oxide block copolymer as a viscosity reducing agent in the preparation of the low profile molding compounds. The preparation of said block copolymers is described in U.S. Pat. No. 3,050,511 which is incorporated herein by reference. For convenience, said block copolymer will be referred to as the "viscosity reducing agent" to distinguish it from other polymeric materials which may be present in the resin composition.

More particularly, the viscosity reducing agent is a block copolymer having the formula $$B_x\text{—}CH_2CH_2(OCH_2CH_2)_yOH$$

or $$HO(CH_2CH_2O)_yCH_2CH_2\text{—}B_x\text{—}CH_2CH_2(OCH_2CH_2)_yOH$$

where B represents a monoalkenyl aromatic monomer, a conjugated diene or mixtures thereof polymerized into a hydrocarbon block segment. Aromatic monomers are well known and include styrene, vinyl toluene, t-butyl styrene, α-methyl styrene and the like. Preferably, the aromatic monomer is styrene. Conjugated dienes include butadiene, isoprene, chloroprene and the like. Generally dienes having four to eight carbon atoms are preferred with butadiene being most preferred.

The value for $x$ is at least about 25 and preferably at least about 50. The molecular weight of the B monomer hydrocarbon block segment preferably is at least about 5,000 and may be as large as 150,000 or even larger. The value for $y$ is at least about 25 and preferably about 50. The upper value for $y$ may be quite large, e.g. as large as 1,000, but there appears to be little value in exceeding about 250 oxyethylene units.

In the preparation of the molding compounds, the viscosity of the resin mix which is combined with the glass fibers is the important factor from the standpoint of fiber wet-out and ease of mechanical handling. A very viscous resin mix causes mixing and handling problems and results in poor fiber wet-out. Accordingly, the value of this invention is shown by the reduction in viscosity of the resin mix obtained by the addition of the block copolymer. Surprisingly, the block copolymer viscosity reducing agent is effective in amounts of about 0.1 to 5 parts per 100 parts of resin-monomer, whereas comparable amounts of well known emulsifiers of surfactants are ineffective. Larger amounts may be used but are not usually necessary. A subsequent example will show comparative results.

The molding compounds may be prepared by combining the components in any convenient order. Generally, it is preferable to add the viscosity reducing block copolymer in the initial stages and before the glass fiber, but the advantages of this invention may be obtained if, for example, all components are simultaneously mixed together. With certain forms of glass fiber such as continuous mats the resin mix is first prepared before impregnating the mat. A skilled worker would be readily able to determine the most convenient order of mixing for his purposes and with his equipment utilizing the disclosure of this invention.

Resin systems for which the viscosity reducing block copolymer is especially useful include an unsaturated polyester resin or a terminally unsaturated vinyl ester resin in admixture with at least one copolymerizable monomer. Generally, the resins are mixed with styrene for thermally cured reinforced articles but for radiation cure other monomers are more preferable such as the hydroxyalkyl acrylates. Mixtures of polyesters and vinyl esters are also contemplated. Generally, the resin comprises from 25 to 70 weight percent of the mixture and the monomer about 30 to 75 weight percent.

Unsaturated polyesters are generally prepared by a condensation reaction between a diol and a dicarboxylic acid or anhydride thereof. Diols include ethylene glycol, diethylene glycol, propylene glycol, dipropylene glycol and the like as well as polyalkylene glycols of higher molecular weight. Said acid includes unsaturated acids such as maleic acid, fumaric acid, itaconic acid or the like. Saturated dicarboxylic acids such as phthalic acid, isophthalic acid, tetrabromophthalic acid, chlorendic acid, adipic acid and the like may be used as partial replacement for the unsaturated acids to vary the degree of unsaturation of the polyester resin. The corresponding anhydrides are preferably employed when available.

Unsaturated polyesters may be generally prepared by heating a mixture of the glycol with the dicarboxylic acid or anhydride in the selected molar proportions at elevated temperatures, usually at about 150° to 225° C. for a period of time ranging from about 5 to 15 hours until the desired acid number is reached. Polymerization inhibitors such as t-butyl catechol may be advantageously added. It is also possible to prepare unsaturated polyesters directly from the appropriate oxide by copolymerization with an anhydride, e.g., propylene oxide can be used in place of propylene glycol and copolymerized with maleic anhydride or a mixture of maleic anhydride and phthalic anhydride. Further description of these well known resins is unnecessary herein.

Terminally unsaturated vinyl ester resins are prepared by reacting about equivalent proportions of a polyepoxide resin and an unsaturated monocarboxylic acid wherein $$\overset{O}{\underset{}{\text{—}\overset{\|}{C}OCH_2\underset{OH}{\overset{|}{C}H}CH_2O\text{—}}}$$

linkages are formed and the resulting resin has terminal, polymerizable unsaturated groups. For example, two equivalents of methacrylic acid may be reacted with two equivalents of a polyepoxide resin to produce a vinyl ester resin.

Vinyl ester resins are described in U.S. Pat. No. 3,367,992 to Bearden wherein dicarboxylic acid half esters of hydroxyalkyl acrylates or methacrylate are reacted with polyepoxide resins. Bowen in U.S. Pat. Nos. 3,066,112 and 3,179,623 describes the preparation of vinyl ester resins from monocarboxylic acids such as acrylic and methacrylic acid. Bowen also describes an alternate method of preparation wherein a glycidyl methacrylate or acrylate is reacted with the sodium salt of a dihydric phenol such as bisphenol A. Vinyl ester resins based on epoxy novolac resins are described in U.S. Pat. No. 3,301,743 to Fekete et al. Fekete et al. also describe in U.S. Pat. No. 3,256,226 vinyl ester resins wherein the molecular weight of the polyepoxide is increased by reacting a dicarboxylic acid with the polyepoxide resin as well as acrylic acid, etc. Other difunctional compounds containing a group which is reactive with an epoxide group, such as an amine, mercaptan and the like may be utilized in place of the dicarboxylic acid. All of the above-described resins which contain the characteristic linkages

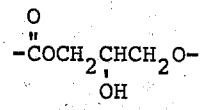

and terminal, polymerizable unsaturated groups, are classified herein as vinyl ester resins. The preparation of vinyl ester resins is fully disclosed in the above patents.

Particularly useful for BMC and SMC are vinyl ester resins wherein the secondary hydroxyl group formed by the intereaction of an epoxide group with a carboxylic acid group has been reacted with a dicarboxylic acid anhydride to produce pendant carboxylic acid groups. A variety of saturated and unsaturated anhydrides similar to those described as useful in preparing polyester resins may be used in proportions of at least about 0.1 mole of anhydride per equivalent of hydroxyl group up to an amount sufficient to react with each hydroxyl. A reaction temperature from about 25° to 150° C. is suitable and any of the well known vinyl polymerization inhibitors may be added to prevent polymerization during the reaction. Such resins are fully disclosed in U.S. Pat. No. 3,564,074.

Briefly, any of the known polyepoxides may be employed in the preparation of the vinyl ester resins of this invention. Useful polyepoxides are glycidyl polyethers of both polyhydric alcohols and polyhydric phenols, flame retardant epoxy resins based on tetrabromo bisphenol A, epoxy novolacs, epoxidized fatty acids or drying oil acids, epoxidized diolefins, epoxidized diunsaturated acid esters as well as epoxidized unsaturated polyesters, so long as they contain more than one oxirane group per molecule. The polyepoxides may be monomeric or polymeric.

Preferred polyepoxides are glycidyl polyethers of polyhydric alcohols or polyhydric phenols having weight per epoxide group of about 150 to 2,000. These polyepoxides are usually made by reacting at least about 2 moles of an epihalohydrin or glycerol dihalohydrin with 1 mole of the polyhydric alcohol or polyhydric phenol, and a sufficient amount of a caustic alkali to combine with the halogen of the halohydrin. The products are characterized by the presence of more than one epoxide group per molecule, i.e., a 1,2-epoxy equivalency greater than one.

Unsaturated monocarboxylic acids include acrylic acid, methacrylic acid, halogenated acrylic or methacrylic acids, cinnamic acid and the like and mixtures thereof, and hydroxyalkyl acrylate or methacrylate half esters of dicarboxylic acids as described in U.S. Pat. No. 3,367,992 wherein the hydroxyalkyl group preferably has from two to six carbon atoms.

Useful dicarboxylic acid anhydrides to modify the vinyl ester resin include unsaturated anhydrides such as maleic anhydride, citraconic anhydride, itaconic anhydride, the various substituted maleic anhydrides and the like, as well as a variety of saturated anhydrides such as phthalic anhydride, chlorendic anhydride, tetrabromophthalic anhydride and the like.

A variety of copolymerizable monomers are available and suitable and include alkenyl aromatic monomers, alkyl esters of acrylic and methacrylic acid, vinyl acetate, acrylonitrile, diallyl maleate, diallyl phthalate, acrylic and methacrylic acid, and the like and mixtures thereof. Preferred are the alkenyl aromatic monomers such as styrene, α-methyl styrene, vinyl toluene, alkyl substituted styrenes such as t-butyl styrene, etc., halogen substituted styrenes such as chlorostyrene, dichlorostyrene and the like.

One group of low profile additives which may be employed is the polyalkenyl aromatic thermoplastics. Typical alkenyl aromatic monomers include styrene, vinyl toluene, t-butyl styrene, α-methyl styrene and the like. Mixtures of said monomers may be used in preparing the polymerized thermoplastic and it is intended herein that the term "polyalkenyl aromatic thermoplastic" include such polymerized mixtures. Polystyrene is a preferred low profile additive.

A second group of low profile additives, which also impart impact resistance, include polydiene rubbers which contain in polymerized form about 30 to 100 weight percent of a conjugated diene or mixtures thereof and correspondingly from 0 to about 70 percent of a monoalkenyl aromatic monomer of the type hereinbefore described. Said polydiene rubbers may be random, graft or block copolymers all of which and their preparation are well known. Many different polydiene rubbers are available commercially. Typical polydiene rubbers are fully disclosed in U.S. Pat. No. 3,674,893 and are incorporated herein by reference.

Conjugated diene monomers include butadiene, isoprene, chloroprene and like monomers, preferably those having four to eight carbon atoms. Butadiene is a preferred monomer, and styrene is a preferred comonomer. Polybutadiene and styrene-butadiene copolymers, especially the block copolymers, are preferred low profile additives.

A third group of low profile additives include the polyalkyl acrylate or methacrylate thermoplastics. Preferably the alkyl group contains from one to about six carbon atoms. The most commonly used polyalkyl methacrylate is polymethyl methacrylate which is preferred herein. It is understood that mixtures of various alkyl acrylate or methacrylate monomers may be used to prepare the thermoplastic polymers.

Other known polymeric low profile additives include polyolefins such as polyethylene, polyvinyl acetates, polycaprolactones, cellulose acetate butyrates and numerous other thermoplastic organic polymeric materials. Mixtures of low profile additives may also be used, e.g., a mixture of polystryene and a polydiene rubber is a particularly beneficial mixture.

To obtain smooth surfaces it is only necessary to add to the resin-monomer mixture about 5 to 20 parts of said low profile additive per 100 parts of resin-monomer. The amount of the viscosity reducing agent ranges from about 0.1 to 5 parts per 100 parts of resin-monomer and will vary depending on the amount of low profile additive present.

In addition to the block copolymer viscosity reducing agent and the low profile additive, $CaCO_3$ as a filler and reinforcing fibers are combined with the resin to make molding compounds according to the improved process of this invention. Ordinarily, the addition of the latter two components results in a significant increase in mix viscosity. However, by the process of adding the block polymer the viscosity actually decreases which improves mechanical handling and allows for increased levels of $CaCO_3$ filler. By the process of this invention filler loadings of about 10 to 150 parts per 100 parts of resin-monomer are readily prepared. Preferably about 60 to 150 parts are employed.

While many types of reinforcing fibers may be used the most widely used fiber is glass fiber which comes in many forms with various surface sizings. Chopped glass fiber is most commonly used in making molding compounds but other forms such as rovings, mats, etc. may be used. Ultimate properties of the cured article depend on how readily the resin wet out the glass fiber, i.e., how readily and uniformly the resin wets and contacts the glass fiber which affects the adhesive bond between the cured resin and the fiber. The fiber component is added in amounts up to about 150 parts per 100 parts of resin-monomer.

Other additives may also be present such as free radical catalysts, e.g., t-butyl perbenzoate, benzoyl peroxide and the like; accelerators such as cobalt naphthanate, N,N-dimethyl toluidine and the like; mold release agents such as metal stearates, fatty alcohol phosphates (Zelec UN) and the like; colorants, etc.

The following non-limiting examples will further illustrate the process of the present invention. All parts and percentages are by weight unless otherwise specified.

EXAMPLE 1

A vinyl ester resin was prepared by first reacting 172 parts of methacrylic acid with 303 parts of an epoxy novolac resin (DEN 438) having an epoxide equivalent weight (EEW) of 175–182 and 56 parts of a glycidyl polyether of bisphenol A (DER 331) having an EEW of 186–192. The resin was then reacted with 90 parts of phthalic anhydride and diluted with 312 parts of styrene (33.4% styrene).

A low profile additive solution was prepared by dissolving 25 parts of a styrene-butadiene (40:60) block copolymer and 12.5 parts of polystryene in 62.5 parts of styrene.

The decrease in viscosity with varying amounts of a 90/200/90 ethylene oxide-styrene-ethylene oxide block copolymer (abbreviated for convenience as EO/S/EO) is shown in the following tests.

To 976 grams of the above resin was added 45 grams of additional styrene, 15 grams of 2,5-dimethyl-2,5 bis(benzoyl peroxy) hexane catalyst (Luperox 118), 1.5 grams of 2,5-dimethylhexane-2,5 diperoctoate catalyst (USP 245), 524 grams of said low profile additive solution, 2250 grams of $CaCO_3$ filler and 52.5 grams of zinc stearate mold release agent. The EO/S/EO block copolymer was added in varying amounts and the mix viscosity was measured at 90°F. using a Brookfield Viscometer with HBT head and a TB spindle at 5 rpm. (Viscosities were measured before converting the resin mix to a SMC by the addition of MgO.)

| Block Copolymer, PHR | Viscosity at 90°F. in cps. |
|---|---|
| 0 | 35,200 |
| ¼ | 20,500 |
| ½ | 15,300 |
| ¾ | 14,400 |
| 1 | 13,440 |

The effectiveness of the block copolymer in reducing the mix viscosity is evident. Because of the reduced viscosity chopped glass fibers were readily mixed with the formulation and better wet out of the fiber by the resin was obtained. It can be seen that a substantial increase in filler loading may be obtained without exceeding the initial viscosity.

EXAMPLE 2

An unsaturated polyester resin was tested in a manner similar to Example 1 to show the viscosity reduction therein. To 800 grams of a commercially available propylene glycol-maleic anhydride unsaturated polyester containing about 30% styrene (P-340, Rohm & Haas) was added 400 grams of an acrylic syrup containing polymethyl methacrylate (30–35% solids) dissolved in styrene (P681, Rohm & Haas) as a low profile additive, 12 grams of t-butyl perbenzoate as catalyst, 1,800 grams of $CaCO_3$ filler and 48 grams of zinc stearate. Resin mix viscosities were measured as before with 0 and 1 PHR of a 99EO/200s/99EO block copolymer added

| Block Copolymer, PHR | Viscosity at 90°F. in cps. |
|---|---|
| 0 | 14,400 |
| 1 | 8,960 |

EXAMPLE 3

A SMC paste similar to Example 1 was prepared containing 45 PHR of chopped glass fiber. A sheet molding compound was prepared from the SMC paste and the development of viscosity with time was measured as before using a TE spindle. In one test no block copolymer was present and in the other 0.5 PHR of a 100EO/200s/100EO block copolymer was added. To each mixture was added 2.5 equivalents of MgO (based on —COOH equivalents) and the viscosity measured.

| Elapsed Time | Viscosity With Block Copolymer | Viscosity Without Block Copolymer |
|---|---|---|
| 2 min. | (Too low to read) | 40,000 cps |
| 6 min. | 16,000 cps | 56,000 cps |
| 12 min. | 45,000 cps | 90,000 cps |
| 20 min. | 90,000 cps | 150,000 cps |
| 30 min. | 225,000 cps | 260,000 cps |

The presence of the block copolymer gives lower initial viscosities and better glass wet-out when the chemical thickening agent is added to make the SMC.

Similar results were obtained when methyl methacrylate, monochlorostyrene or acrylonitrile were used as partial replacements for the styrene.

EXAMPLE 4

Two SMC formulations were prepared similar to Example 3, one with 1 PHR of a 90EO/200S/90EO block copolymer and one without. The SMC formulations contained about 30% chopped 1 inch glass fiber (OCF K427AA). After the SMC formulations had matured, 0.110 inch thick panels were molded and tested for physical properties.

| | With Block Copolymer | Without Block Copolymer |
|---|---|---|
| Viscosity* | 12,000 cps | 30,000 cps |
| Tensile Strength | 15,000 psi | 12,000 psi |
| Flex Strength | 30,000 psi | 25,000 psi |

*Prior to addition of MgO

The block copolymer viscosity reducing agent may be dissolved in the copolymerizable monomer or in a solvent such as tetrahydrofuran. The molding compounds may be prepared at temperatures ranging from room temperature up to 100° F. but no limitation to these temperatures is intended. The various components of the molding compounds may be combined in any convenient order but generally the block copolymer catalysts, low profile additive, monomers and resin are combined together first followed by the addition of CaCO$_3$ and glass fibers and then the chemical thickening agent.

Various substitutions may be made for the components employed in the above examples. Suitable block copolymer viscosity reducing agents which may be used include 56EO/100S/56EO, 93EO/100S/93EO, 144EO/100S/144EO, 58EO/200S/58EO, 217EO/200S/217EO, 116EO/400S/116EO, 55EO/125S, 123EO/200B/123EO where B stands for butadiene, 90EO/100TBS/90EO where TBS stands for t-butyl styrene. Among the low profile additives which may be used are polybutadiene, high impact polystryene, polyvinyl toluene, and various styrene-butadiene block rubbers such as B/S blocks with weight proportions of 50/50, 60/40, 70/30 or 75/25 and S/B/S blocks such as 20/60/20.

EXAMPLE 5

Parabisphenol A (19 parts) was reacted with 140 parts of D.E.R. 331 to produce a polyepoxide having an EEW of about 275. This resin was blended with 242 parts of an epoxy novolac (D.E.N. 438). The polyepoxide blend was then reacted with 169 parts of methacrylic acid to produce a vinyl ester resin. This resin was further modified similar to Example 1 by reaction with 165 parts of maleic anhydride. The final resin was diluted with 312 parts of styrene (33.4%).

The above resin was used to evaluate the effectiveness of well-known emulsifiers to reduce the viscosity of a resin mix.

The resin mix in all cases was a mixture of 650 parts of the above styrene diluted resin, 10 parts of t-butyl perbenzoate catalyst, 350 parts of a low profile additive solution (25 parts of a 50:50 styrene: butadiene block copolymer and 12.5 parts of polystyrene in 62.5 parts of styrene), 1500 parts of CaCO$_3$ and 40 parts of zinc stearate mold release agent.

The following table shows the viscosities of the resin mix with 0.5 PHR of various emulsifiers measured at 90° F. using a Brookfield Viscometer with HBT head and a TA spindle at 5 rpm. The viscosities were measured after the resin mixtures had been kept at 90° F. for 24 hours.

|   | Emulsifier | Viscosity, cps. |
|---|---|---|
| A | Control | 76,800[1] |
| B | Pluronic L62 | 66,400 |
| C | Ethoquad C/25 | 80,800 |
| D | Tween 85 | 64,800 |
| E | Triton X-100 | 75,300 |
| F | Pluronic L64 | 70,500 |
| G | Dowfax 2A1 | 70,400 |
| H | 100EO/200S/100EO | 41,600[2] |
| I | do. | 29,600[3] |

[1] No emulsifier added
[2] 1.71 PHR (added as a solution in styrene)
[3] about 2.6 PHR (added as a solution in styrene).

The above results illustrate the effectiveness of the block copolymer in reducing the viscosity of the resin mix by as much as 46% in one case and by 61.5% in another. In contrast, the best of the six commercially available emulsifiers reduced the viscosity only 15.5% and in one instance increased in viscosity. All the commercial emulsifiers are listed and identified in McCutcheon's "Detergents and Emulsifiers."

What is claimed is:

1. An improved process for making low profile molding compounds from a mixture of a thermosettable resin and a copolymerizable monomer wherein said resin is an unsaturated polyester resin, a terminally unsaturated vinyl ester resin or mixtures thereof, said process comprises combining with 100 parts of said resin-monomer mixture at least about 0.1 part of a block copolymer viscosity reducing agent in combination with about 5 to 20 parts of a polymeric low profile additive, about 10 to 150 parts of CaCO$_3$ and up to 150 parts of a fibrous reinforcing material, wherein said block copolymer has the formula

(I)

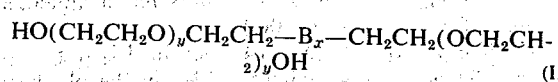

(II)

where B is a monoalkenyl aromatic monomer, a conjugated diene monomer or mixtures thereof polymerized into a block segment and where $x$ and $y$, each, have a value of at least about 25.

2. The process of claim 1 where the value for $x$ and $y$ is at least about 50 in each instance.

3. The process of claim 2 wherein the value for $y$ is about 50 to 250.

4. The process of claim 2 wherein $x$ has a value such that the block of B monomers has a molecular weight of at least about 5,000.

5. The process of claim 2 wherein B is styrene.

6. The process of claim 1 wherein the resin-monomer mixture comprises about 25 to 70 weight percent resin and 30 to 75 percent monomer.

7. The process of claim 2 wherein said low profile additive is a polydiene rubber containing in polymerized form about 30 to 100 weight percent of a conjugated diene and the balance to make 100 percent of a monoalkenyl aromatic monomer.

8. The process of claim 7 wherein said low profile additive is polybutadiene or a block copolymer of styrene-butadiene.

9. The process of claim 2 wherein said low profile additive is a mixture of polystyrene and a block copolymer of styrene-butadiene.

10. The process of claim 1 wherein said molding compound contains about 0.1 to 5 parts of the viscosity reducing agent.

11. The process of claim 1 wherein said resin is an unsaturated polyester resin.

12. The process of claim 1 wherein said resin is a terminally unsaturated vinyl ester resin.

13. A process according to claim 1 for preparing bulk and sheet molding compounds further comprising the step of adding a chemical thickening agent in an amount sufficient to thicken said compounds.

14. An improved process for making low profile molding compounds from a mixture of a terminally unsaturated vinyl ester resin and a copolymerizable monomer comprising combining with 100 parts of said resin-monomer mixture at least about 0.1 part of a block copolymer viscosity reducing agent in combination with about 5 to 20 parts of a polymeric low profile additive, about 10 to 150 parts of $CaCO_3$ and up to 150 parts of a fibrous reinforcing material, wherein said block copolymer has the formula

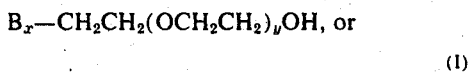
(I)

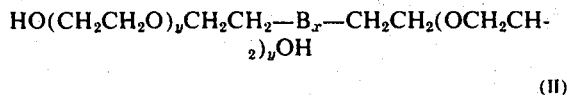
(II)

where B is a monoalkenyl aromatic monomer, a conjugated diene monomer or mixtures thereof polymerized into a block segment and where $x$ and $y$, each, have a value of at least about 50.

15. The process of claim 14 wherein the value for $y$ is about 50 to 250.

16. The process of claim 14 wherein $x$ has a value such that the block of B monomers has a molecular weight of at least about 5,000.

17. The process of claim 14 wherein B is styrene.

18. The process of claim 14 wherein the block copolymer has the formula II.

19. The process of claim 14 wherein the molding compound contains about 0.1 to 5 parts of the viscosity reducing agent.

20. The process of claim 14 wherein the resin-monomer mixture comprises about 25 to 75 weight percent resin and 30 to 75 monomer.

21. The process of claim 14 wherein the low profile additive is a polydiene rubber containing in polymerized form about 30 to 100 weight percent of a conjugated diene and the balance to make 100 percent of a monoalkenyl aromatic monomer.

22. The process of claim 14 wherein said low profile additive is polystyrene, polybutadiene or a styrene-butadiene block copolymer.

23. The process of claim 14 wherein said low profile additive is a mixture of polystryene and a styrene-butadiene block copolymer.

24. The process of claim 14 wherein said resin is a vinyl ester resin modified to have carboxylic acid groups by reaction with a dicarboxylic acid anhydride.

25. A process according to claim 24 for preparing bulk and sheet molding compounds further comprising the step of adding a chemical thickening agent in an amount sufficient to thicken said compounds.

26. The process of claim 25 wherein said agent is an alkaline earth oxide or hydroxide.

27. The process of claim 25 wherein said agent is magnesium oxide.

* * * * *